Dec. 16, 1958  L. O. IMBER ET AL  2,864,121
TORSION SPRING HINGE UNIT
Filed Jan. 25, 1956  3 Sheets-Sheet 1
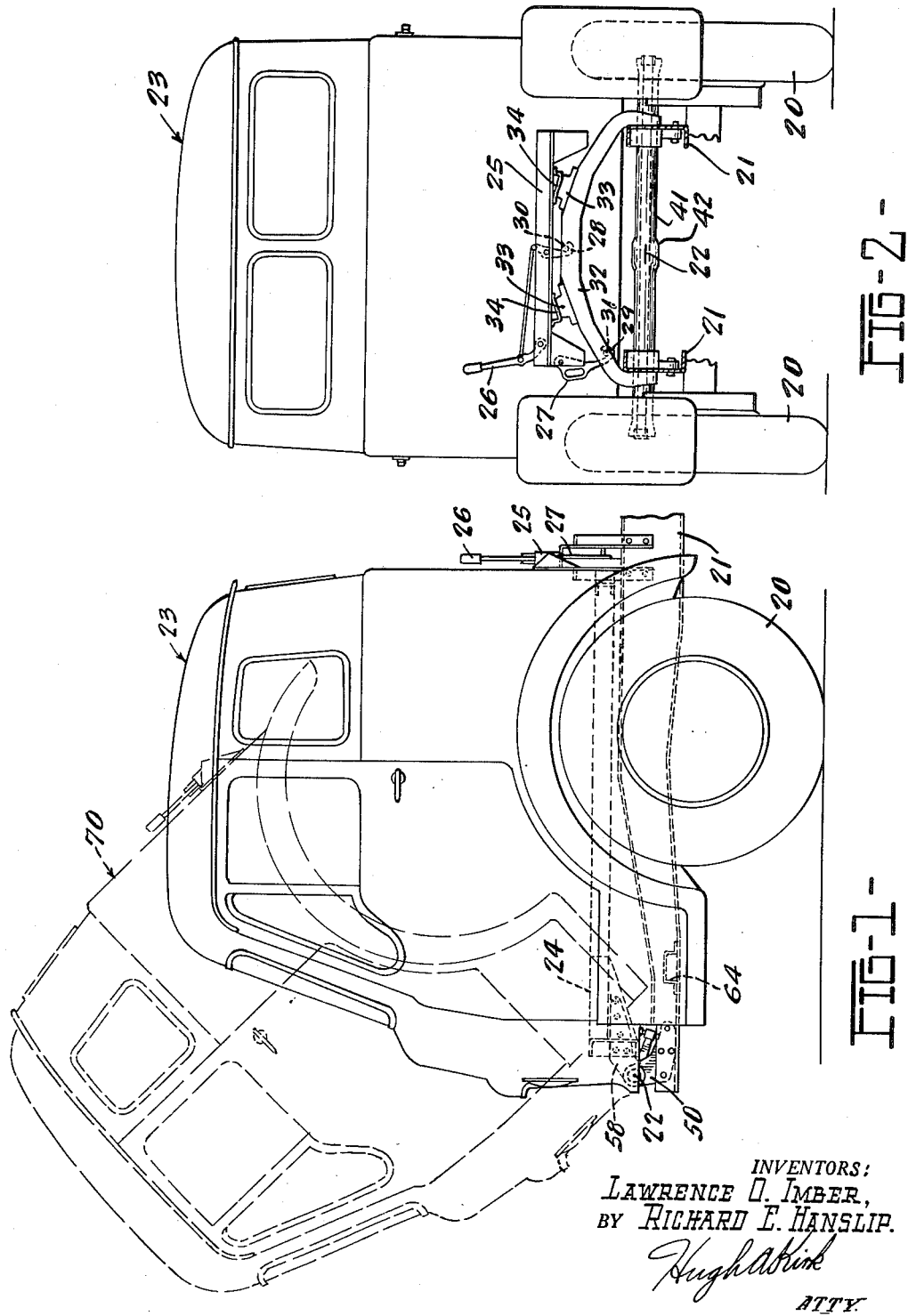
INVENTORS:
LAWRENCE O. IMBER,
BY RICHARD E. HANSLIP.
Hugh A Kirk
ATTY.

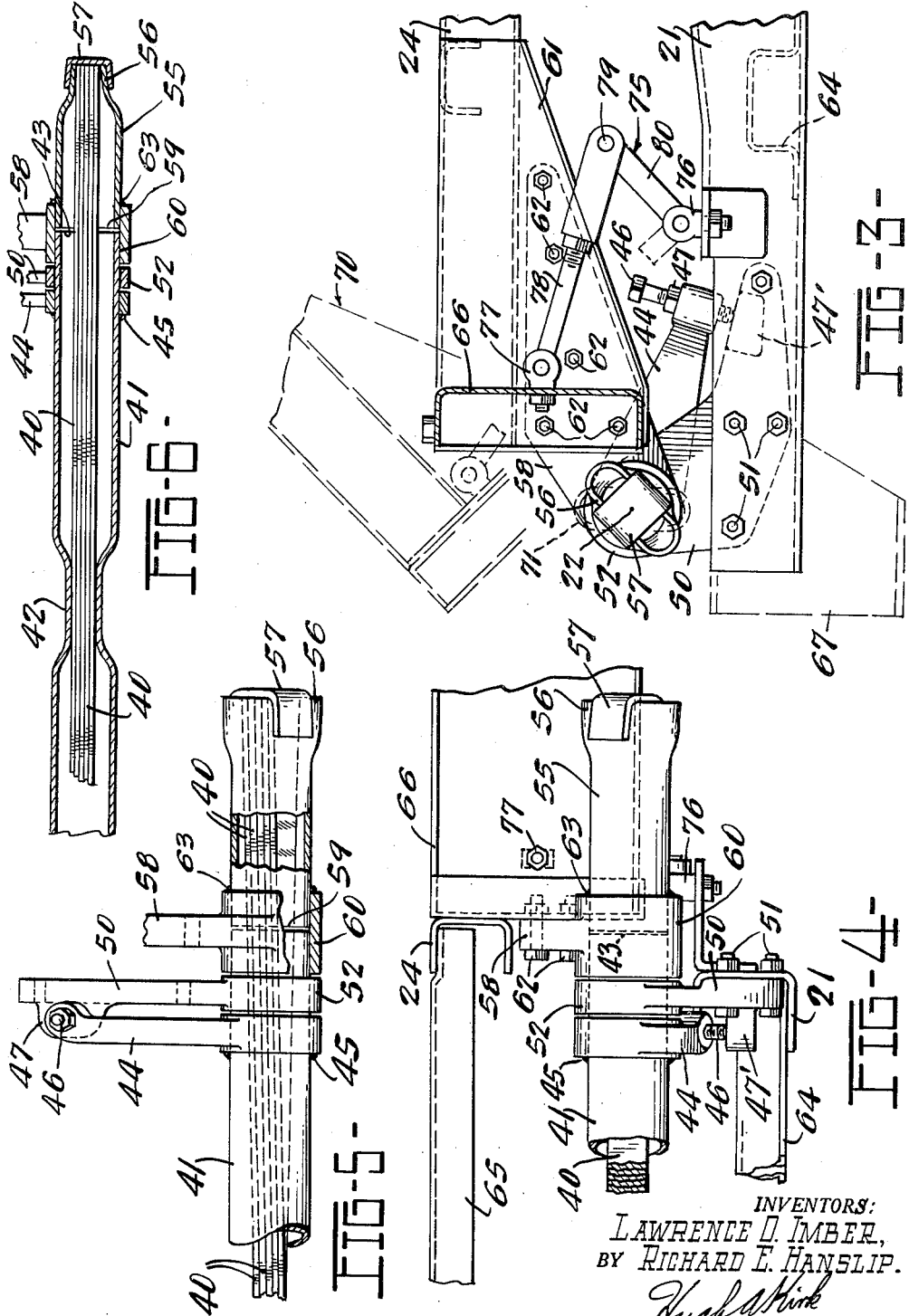

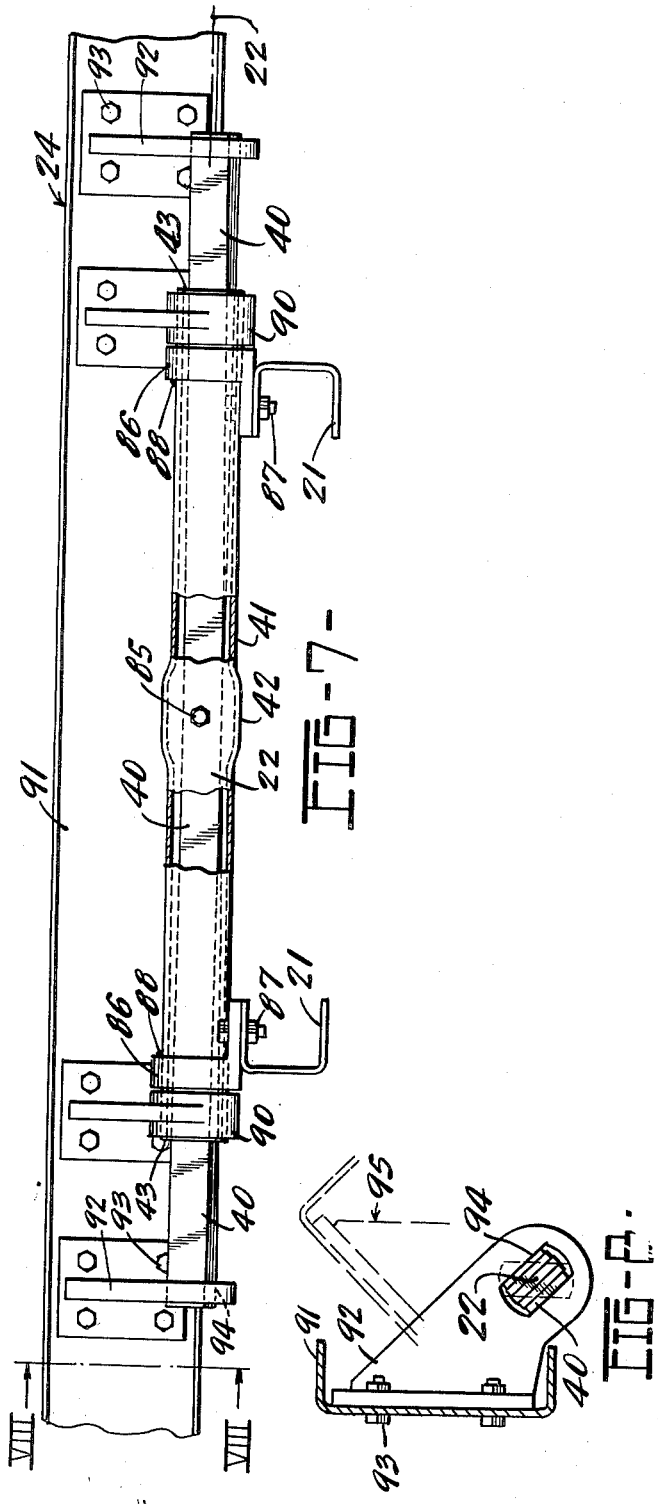

United States Patent Office 2,864,121
Patented Dec. 16, 1958

2,864,121

TORSION SPRING HINGE UNIT

Lawrence O. Imber, Adams Township, and Richard E. Hanslip, Toledo, Ohio, assignors to The Mather Spring Company, Toledo, Ohio, a corporation of Ohio Application January 25, 1956, Serial No. 561,305

16 Claims. (Cl. 16—184)

This invention relates to a torsion spring hinge unit between two pivotally connected members. More particularly, it deals with such a torsion spring unit for counterbalancing a hinged member, including the specific features of the torsion spring itself and as well as part of the hinge. These units are particularly adaptable, for example, for the mounting of tiltable cabs on the frames of cab-over-engine vehicles or trucks.

It is an object of this invention to produce a simple, efficient, effective and economic torsion spring hinge unit.

Another object is to produce such a hinge unit which is powerful and compact and requires substantially no more space than that of a longitudinal hinge along the edge of two members.

Another object is to provide a torsion spring which produces an equal torque in the same direction at each end of its longitudinal spring element.

Another object is to produce such a spring in which the torsion member is completely enclosed within one or more aligned tubular members, the axes of which members also acts as the axis of a hinge.

Another object of this invention is to produce such a torsion spring hinge unit for mounting tiltable cabs on vehicle frames so as to take up as little space as possible and also to counterbalance the weight of the cab around its tilting hinge, so it may be readily moved by the force of a man without requiring additional power.

Generally speaking, the torsion spring hinge unit of this invention for pivotally connecting two members comprises a torsion spring element located either along or parallel with the axis of the hinge, a bearing hinge means connected to at least one of the two members which are pivotally connected by the hinge, and means for connecting said torsion spring element to each of said pivotally connected members. The torsion spring element may comprise a bar with a lever or hook at one or both of its ends, or may comprise a plurality of plates or stack of strips which permit more flexibility within shorter lengths than that of one solid bar of the same strength.

The means for connecting the torsion element to the pivotally connected members may comprise: levers, tubular anchors over one or both ends of the torsion element to shorten the axial distance between the effective levers connected to the ends of the torsion element, and/or a tube around the central portion of the torsion element in which the element is anchored at a point at the center of the element so that opposite ends of the torsion element may produce equal torques in the same direction on the member to which it is pivotally connected. One or more of the levers between the torsion spring hinge unit and one of the pivotally connected members may be adjustable to vary the torque or torsion in the spring element. Since attachment of the torsion element at its center divides its effective length in half, it is desirable for compactness sake to employ the stacks of strips or plates as the torsion element for this construction.

If the longitudinal torsion spring element is located along the axis of the hinge of the unit so as to form part of the hinge itself, it may only be necessary to provide hinge bearing means for the torsion spring element connected to one of the members. However, if the torsion spring element is parallel to the axis of the hinge, separate cooperating hinge bearing means and pivots may be provided connected to each of the pivotally connected members, which require additional space.

The pivotally connected members between which the torsion spring hinge unit of this invention may be effectively employed include a tiltable cab and a frame of a truck or other vehicle in which the weight of the cab is counterbalanced by the torsion in the spring hinge unit and the spring hinge is sufficiently compact to permit easy access under the cab to the motor or parts of the vehicle when the cab is tilted away from the frame member. Between such a cab member and vehicle frame member, it is desirable that the tension in the spring element of the hinge unit be adjustable to compensate for different weights and centers of gravity of different cabs. Such tiltable cabs for vehicles are generally releasably anchored by a catch or similar means at its side opposite the spring hinge unit, so that as soon as the catch means is released, the tension of the hinge of the unit may immediately lift or tilt the cab at least partway without any lifting effort on the part of the operator releasing the cab.

The above mentioned and other features and objects of this invention and the manner of attaining them will become more apparent and the invention itself will be best understood by reference to the following description of an embodiment of the invention taken in conjunction with the accompanying drawings, wherein:

Fig. 1 is a side elevation of the front end of a tiltable cab-over-engine truck, in which the cab is shown in dotted lines in its tilted position pivoted around a torsion spring hinge unit according to one embodiment of this invention;

Fig. 2 is a rear view of that portion of the cab-over-engine vehicle shown in Fig. 1 with the engine removed from the vehicle and looking from the back toward the front end torsion spring hinge unit;

Fig. 3 is an enlarged side elevation of one end of the torsion spring hinge unit shown in Fig. 1 with parts of the cab and frame being broken away and showing a link connection between the cab and frame members for limiting the rotation about the hinge unit to that of the dotted position for the cab member;

Fig. 4 is a left or front side elevation of one end of the hinge unit shown in Fig. 3 with parts of the cab, frame and torsion spring unit toward the other or left side of the vehicle being broken away;

Fig. 5 is a top plan view of Fig. 4 with other parts of the vehicle being broken away showing the twist of the stack of plates of the torsion element in the torsion spring unit;

Fig. 6 is a partial longitudinal vertical section of the torsion spring element and tubular housing therefor of the unit of Figs. 3–5 shown in its normal unstressed condition with parts of the hinge bearing means and torsion lever arms broken away;

Fig. 7 is a front elevation of another embodiment of a torsion spring hinge unit similar to that shown in Figs. 1 to 6 without the tubular anchors covering the ends of the stack of plates of the torsion spring element; and Fig. 8 is a left end view taken along line VIII—VIII of Fig. 7 showing the portion of the cab frame in dotted lines in its tilted spring non-torsioned position.

Referring first to the vehicle shown in Figs. 1 and 2, the front cab end of a truck is disclosed including a pair of front wheels 20 mounted on a vehicle frame 21 at the front (or left in Fig. 1) edge of which is mounted a torsion spring hinge unit according to this invention providing a pivot axis 22 for the whole cab; door and fender assembly 23 mounted over the front end of the frame 21. This cab assembly includes a base frame member 24 to the front end of which the torsion spring hinge unit is connected adjacent the pivotal axis 22. The opposite side of the tiltable cab 23 from axis 22 may be provided with a manually operated fastening device mounted on a bracket 25 and comprising pivoted levers 26 and 27 which operate hooks 28 and 29 (see Fig. 2) that engage pins 30 and 31, respectively, mounted on a bridge 32 on the frame 21 under said bracket 25. The bridge 32 and bracket 25 may provide abutting and aligning pairs of stops 33 and 34, respectively, which engage when the cab is in its vehicle driving, closed or untilted position as shown in full lines in Figs. 1 and 2.

Referring now to the details in Figs. 3 to 6 of the torsion spring hinge unit embodiment shown along the axis 22 in Figs. 1 and 2, this particular embodiment comprises a torsion element composed of a plurality (herein 5) of longitudinal metal torsion strips or spring leaves 40 (see Figs. 5 and 6) which are aligned and stacked together and may include liners between and/or around them. This torsion element 40 is located inside a tube 41 which herein is flattened at its center 42 halfway between its ends 43 to engage the upper and lower flat sides of the stack of strips 40 and prevent them from turning relative to the tube 41 at the center point or location 42. The tube 41 however is sufficiently large in diameter so that the ends of the strips 40 extending on either side thereof may twist inside the non-flattened portions of the tube as shown in Fig. 5 without obstruction or resistance by the inside of the tube 41. This tube 41 is shown herein to have anchored near each of its ends 43 a pair of lever arms 44 which may be welded at 45 to the outside of the tube 41. The outer ends of each of these two lever arms may be provided with an adjustable bolt 46 and lock nut 47 (see Fig. 3) for adjusting the angular position of the flattened central portion 42 of the tube 41 with respect to the frame member 21, since the end of the bolts 46 abut against projections 47' anchored to the frame member 21. These projections 47' may be located on the inside of each of a pair of hinge bearing brackets 50 secured to the end of the frame 22 such as by bolts 51, which brackets provide bearing ring supports 52 for each end of the tube 41. The levers or arms 44 and 50 accordingly support, locate and connect the tube 41 with the frame member 21 of the vehicle, which tube 41 anchors the central portion of the torsion spring element 40 from rotation at its center 42.

Extending beyond the ends 43 of the tube 41 are the opposite ends of the stack of strips 40 of the torsion element, which ends herein are shown protected or covered by similar short tubular anchor sections 55 the outer ends of which are crimped or pinched together to form flattened portions 56 engaging opposite sides of the stack of strips 40. These pinched or flattened sections 56 are similar to the pinched central section 42 of the tube 41, however they may be reinforced by U-clips 57 so that the relative twisting movement between the outer ends of the plates 40 and the central portion 42 will not spread the flattened ends 56 of the tubular anchors 55. These tubular anchor sections 55 together with the tube 41 completely enclose the torsion element or stack of strips 40 to keep them clean, safe, away from any obstruction material or away from obstructing or interfering with any outside material. The inner adjacent ends 59 of the tubular anchor portions 55 may have lever arms 58 which may have socket bearings 60 in which the ends 43 of the tube 41 fit and are journalled, thus maintaining the alignment of the movable end anchors 55 with that of the tube 41. The socket ends of the arms 58 are welded at 63 to the inner ends of tubular anchors 55. These levers 58 are connected to the cab frame 24 such as through a gusset member 61 welded to the frame 24, with the levers 58 bolted to the gusset by bolts 62.

Thus the pair of levers 58 at each end of the torsion spring element 40 produce torques in the same direction relative to the center portion 42 of the element 40, so that there is the same thrust on each side of the cab 23 and its frame 24 to prevent it from binding about the hinge bearings 52 and 60 and also moving skew or out of alignment with the vehicle frame 21 and axis 22 of the hinge. Accordingly, as the cab 23 and its frame 24 is moved into its dotted position 70 shown in Figs. 1 and 3, the ends 56 of the torsion bar are twisted into the dotted position 71 shown in Fig. 3 so that the flattened portions 42 and 56 are in substantial alignment with each other and the bars 40 are substantially under no or their least amount of torsion. However, as the cab is tilted so that its center of gravity moves farther from the axis 22 more twist is put on the strips of torsion member 40 as shown in Fig. 5 to counterbalance the weight of the cab so it may be moved easily by a man without the help of another outside source of power.

In Fig. 4 there is shown a cross tie member 64 between the parallel channels of the frame 21, and cross tie member 65 between the parallel channels of the frame 24, to which frame 24 is also shown extension 66 upon which the fenders on the cab may be mounted. In Fig. 3 there is shown in dotted lines an extension 67 which may be connected to the ends of the parallel channels of frame 21 for mounting the bumper at the front end of the vehicle.

In order to limit the movement of the cab 23 and its frame 24 about the pivotal axis 22 of the torsion spring hinge unit of this invention, there may be provided an adjustable link means 75 which may be connected between an eye bolt 76 mounted on the frame 21 and an eye bolt 77 mounted on the frame 24 of the cab, the eyes of which bolts 76 and 77 may be connected through an adjustable link 78 pivoted to eye bolt 77 and at its other end pivoted at 79 to a second link 80 which is pivoted to the eye bolt 76. Thus, as the cab moves into the dotted line position 70 shown in Fig. 3, the links 78 and 80 are aligned and tensioned to prevent further rotation of the cab 23 about the hinge axis 22. However, other limiting or stop devices may be provided, if desired, without departing from the scope of this invention.

Another embodiment of the invention similar to that disclosed in Figs. 1 to 6 is shown in Figs. 7 and 8 in which the tubular anchors 55 have been eliminated from the ends of the stack of strips 40 making up the torsion spring element and the central flattened portion 42 of the tube 41 in which the strips 40 are held may be provided with a bolt 85 extending clear through the tube and all of the centers of the strips 40 so as to prevent their axial slipping through or in the tube 41, which slipping is not possible when the tubular anchors 55 are used. This embodiment is simpler than that formerly described, but the principle of operation remains the same by providing an equal torque at opposite ends of the torsion element 40 which is anchored at its center to the frame 21 through the bolt 85, tube 41 and brackets 86 mounted at opposite ends of the tube 41, and connected such as by bolts 87 directly to the parallel side channels of the frame 21. The brackets 86 may be welded as at 88 near the ends of the tube 41. The ends 43 of tube 41, however, may extend slightly beyond the brackets 86 to provide bearing surfaces for bearing supports or brackets 90 which may be mounted on the cross tie member 91 at the front end of the cab frame 24. Thus, the tube 41 together with the brackets 86 and 90 provide a hinge unit with the torsion element 40. The opposite ends of the torsion element or stack of strips 40 may be connected in brackets or levers 92 which may be fastened such as by bolts 93 also to the cross channel 91, which levers 92 may be provided with slots or elongated apertures 94 into which the ends of the five strips 40 are anchored so they may be rotated or twisted about the axis 22 of the hinge unit provided by the tube 41 and its supporting and connecting brackets 86 and 90.

The 45° angle of twist of the strips 40 into their substantially in line untwisted position 95 is shown in dotted lines in Fig. 8, with the normal cab closed position being shown in full lines in both Figs. 7 and 8 wherein the ends of the strips 40 are twisted about 45° from that of the plane of the center vertical flat portion 42 of the tube 41, so that they are constantly under torsion to counterbalance the weight of the cab 23 as soon as the cab is unlatched or released from the frame by operation of the manual latching means 26 and 27 shown in Fig. 2. The strength, thickness and dimensions of the torsion element 40 depends upon the weight and relative location of the center of gravity of the cab it is to counterbalance. However, slightly varying weights may be provided for by an adjustable lever similar to that of lever 44 shown in the previous embodiment of Figs. 3–5, which also may be employed in the embodiment of Figs. 7 and 8 without departing from the scope of this invention.

Although the above mentioned embodiments of this invention are applied specifically to a tiltable cab on a verticle, this invention also includes specific features in the torsion spring and hinge of the unit which may be applicable to other devices without departing from the scope of this invention. Also different features of this invention shown on different embodiments thereof may be interchanged without departing from the scope of this invention, such as for example, an adjustable lever arm may be provided on the embodiment shown in Figs. 7 and 8, or this adjustment feature may be omitted from the embodiment shown in Figs. 1 through 6. Also the levers which are employed for connecting the torsion spring unit with the members of the cab and the frame may be changed in design and shaped to conform with different structures and to withstand different stresses as may be required. And again the hinge bearing means may be located on either of the pivotally connected members or on both as shown with the adjusting lever arms. Still further, the tubular anchors provided at the end of the torsion element in the embodiments shown in Figs. 3 to 6 may be eliminated and levers or brackets may be employed in their stead, such as shown in the other embodiments, or only one of the tubular anchors may be provided at one end of the torsion member, as required or desired.

While there is described above the principles of this invention in connection with specific apparatus, it is to be clearly understood that this description is made only by way of example and not as a limitation to the scope of this invention.

What is claimed is:

1. A torsion spring hinge unit connecting two members, comprising: a longitudinal torsion spring element, a tube surrounding said element intermediate of the ends of said element, means for fastening said element centrally of said tube to said tube, means for anchoring said tube to one of said members, means for anchoring both ends of said torsion element to the other of said members, whereby equal torque is transmitted in the same direction from each end of said torsion element, and separate bearing means for said tube between said anchoring means for said tube and said anchoring means for each end of said element, whereby said torsion element is located along the axis of the hinge between said members formed by said bearing means on said tube.

2. A unit according to claim 1 wherein said torsion spring element comprises a plurality of resilient strips stacked adjacent to each other.

3. A unit according to claim 1 including means for adjusting at least one of said anchoring means for connecting said unit to one of said members for varying the torsion in said spring element.

4. A unit according to claim 1 wherein said anchoring means at both ends of said element include a tubular anchor mounted over each end of said element, and levers attached to said tubular anchors.

5. A unit according to claim 4 wherein said tubular anchors include said bearing means which fit over the adjacent end of said tube.

6. A unit according to claim 1 including means to limit the movement between said members about the axis of the hinge.

7. A unit according to claim 1 wherein said torsion element comprises a resilient strip of springy material, and said means for fastening said torsion element centrally of said tube comprises a flattened portion centrally of said tube contacting opposite sides of said strip extending through said tube.

8. A hinge unit according to claim 1 wherein said means for fastening said element centrally of said tube comprises a bolt extending through said tube and said element.

9. A combination torsion spring and hinge unit between two members, comprising: a longitudinal torsion spring strip, a tube surrounding said strip intermediate of the ends of said strip, said tube having a flattened portion centrally of said tube contacting opposite sides of said strip for fastening said strip to said tube between the ends of said resilient strip, means for anchoring said tube to one of said members, means for anchoring the opposite ends of said strip to the other of said members, and separate bearing means for said tube between said anchoring means for said tube and each of said anchoring means for said strip, whereby equal torque is transmitted in the same direction from both ends of said strip and said strip is located along the axis of the hinge between said members.

10. A combination unit according to claim 9 wherein said torsion spring strip comprises a plurality of aligned strips and said means for anchoring the opposite ends of said strips includes means for clamping the ends of said aligned strips together.

11. A combination unit according to claim 9 wherein said means for anchoring the opposite ends of said strip to include tubular means mounted over the opposite ends of said strip and bridging the space between the ends of said tube and said opposite ends of said strip.

12. A combination unit according to claim 11 wherein said tubular means include said separate bearing means which fit over the ends of said tube whereby said strip is completely housed by said tube and said tubular means.

13. In a vehicle having a frame, a tilting cab, and a counterbalanced hinge unit between said frame and said cab, said hinge unit comprising: a longitudinal torsion spring element, a tube surrounding said element intermediate of the ends of said element, means for fastening said element centrally of said element and said tube to said tube, means for anchoring said tube to said frame, means for anchoring the opposite ends of said element to said cab, and separate bearing means for said tube adjacent said anchoring means for the opposite ends of said torsion element, whereby equal torque is transmitted in the same direction from both ends of said element and said element is located along the axis of said hinge.

14. A hinge unit according to claim 13 including means to adjust the torsion in said torsion spring element.

15. A hinge unit according to claim 13 including means to limit the pivotal movement of said cab away from said frame of said vehicle about said hinge.

16. A counterbalanced hinge mounting for a tilting cab on a vehicle frame, said mounting comprising: a longitudinal torsion spring strip element, a tube surrounding said element intermediate of the ends of said element, a flattened section centrally of said tube for fastening said element to said tube intermediate both the ends of said element and said tube, means for anchoring said tube near its ends to said vehicle frame, means for anchoring the opposite ends of said element to said cab, and separate bearing means around said tube between both of said anchoring means whereby said torsion spring element is located along the axis of said hinge and an equal torque is transmitted in the same direction from both ends of said torsion spring element.

References Cited in the file of this patent

UNITED STATES PATENTS

| | | |
|---|---|---|
| 514,076 | Hotz | Feb. 6, 1894 |
| 2,059,908 | Rabe | Nov. 3, 1936 |
| 2,260,508 | Chambers | Oct. 28, 1941 |
| 2,297,465 | Froehlich | Sept. 29, 1942 |
| 2,540,279 | Mosier | Feb. 6, 1951 |
| 2,588,456 | Allen | Mar. 11, 1952 |
| 2,631,844 | Paton | Mar. 17, 1953 |
| 2,740,487 | Murty et al. | Apr. 3, 1956 |
| 2,760,553 | Lie | Aug. 28, 1956 |
| 2,774,099 | Thomas | Dec. 18, 1956 |

FOREIGN PATENTS

| | | |
|---|---|---|
| 660,443 | Great Britain | Nov. 7, 1951 |
| 673,013 | Great Britain | May 28, 1952 |
| 1,071,326 | France | Mar. 3, 1954 |

OTHER REFERENCES

IHC Balanced Tilting Cab in "Automotive, Industries" magazine, August 1, 1954, page 68.